Figure 1:
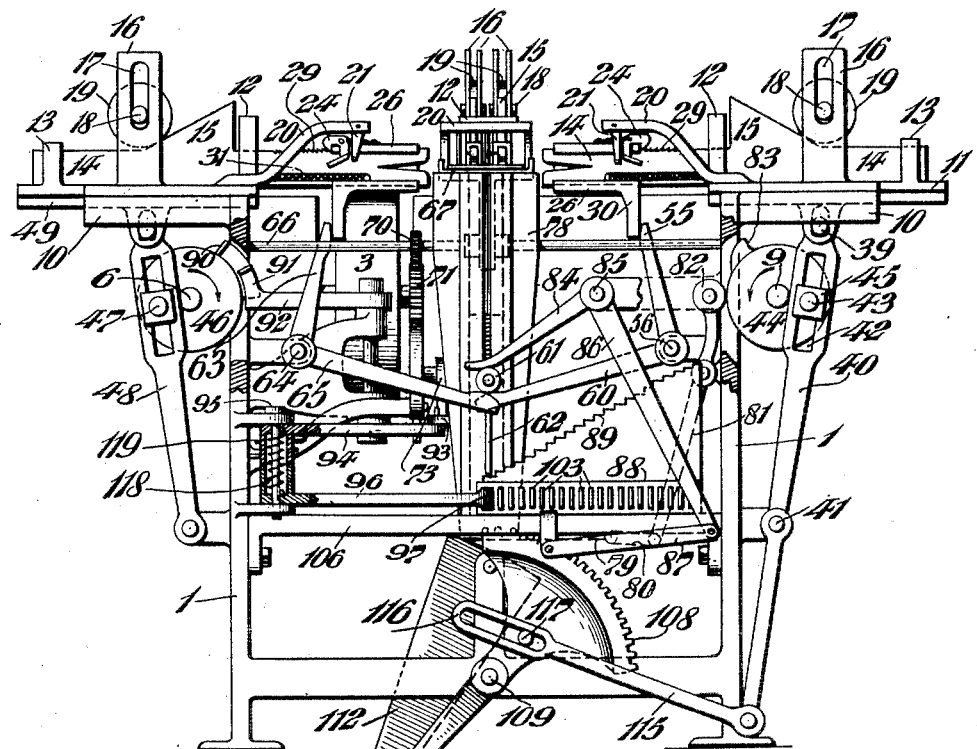

H. C. BROWN.
GRADING, STAMPING, AND SELECTING MACHINE.
APPLICATION FILED SEPT. 25, 1912.

1,081,361.

Patented Dec. 16, 1913.

4 SHEETS—SHEET 1.

WITNESSES
H. F. Dieterich
L. Couville

INVENTOR
Henry C. Brown.
BY Wiedersheim Fairbanks
ATTORNEYS

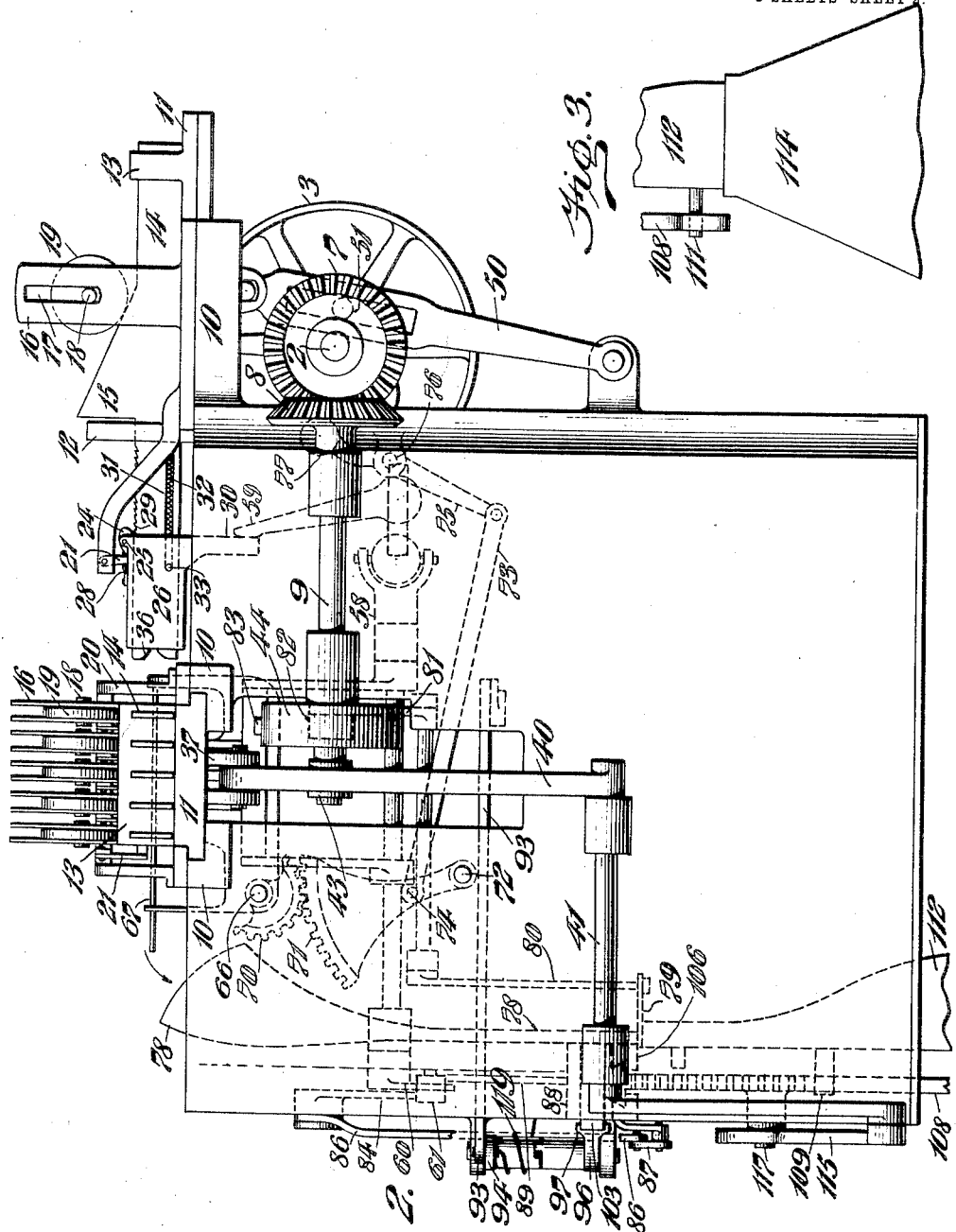

H. C. BROWN.
GRADING, STAMPING, AND SELECTING MACHINE.
APPLICATION FILED SEPT. 25, 1912.
1,081,361.
Patented Dec. 16, 1913.
4 SHEETS—SHEET 3.
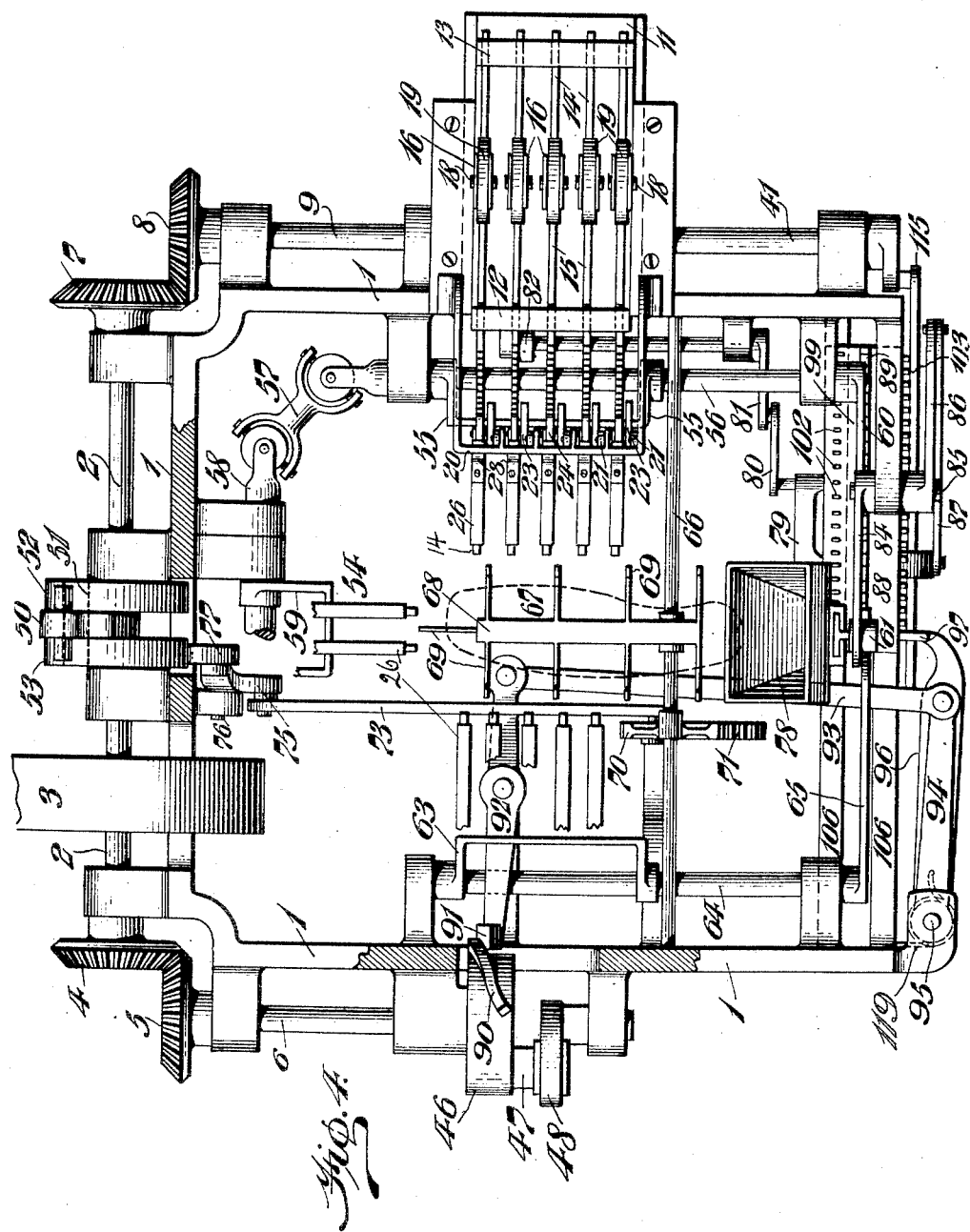
WITNESSES
INVENTOR
ATTORNEYS H. C. BROWN.
GRADING, STAMPING, AND SELECTING MACHINE.
APPLICATION FILED SEPT. 25, 1912.
1,081,361.
Patented Dec. 16, 1913.
4 SHEETS—SHEET 4.
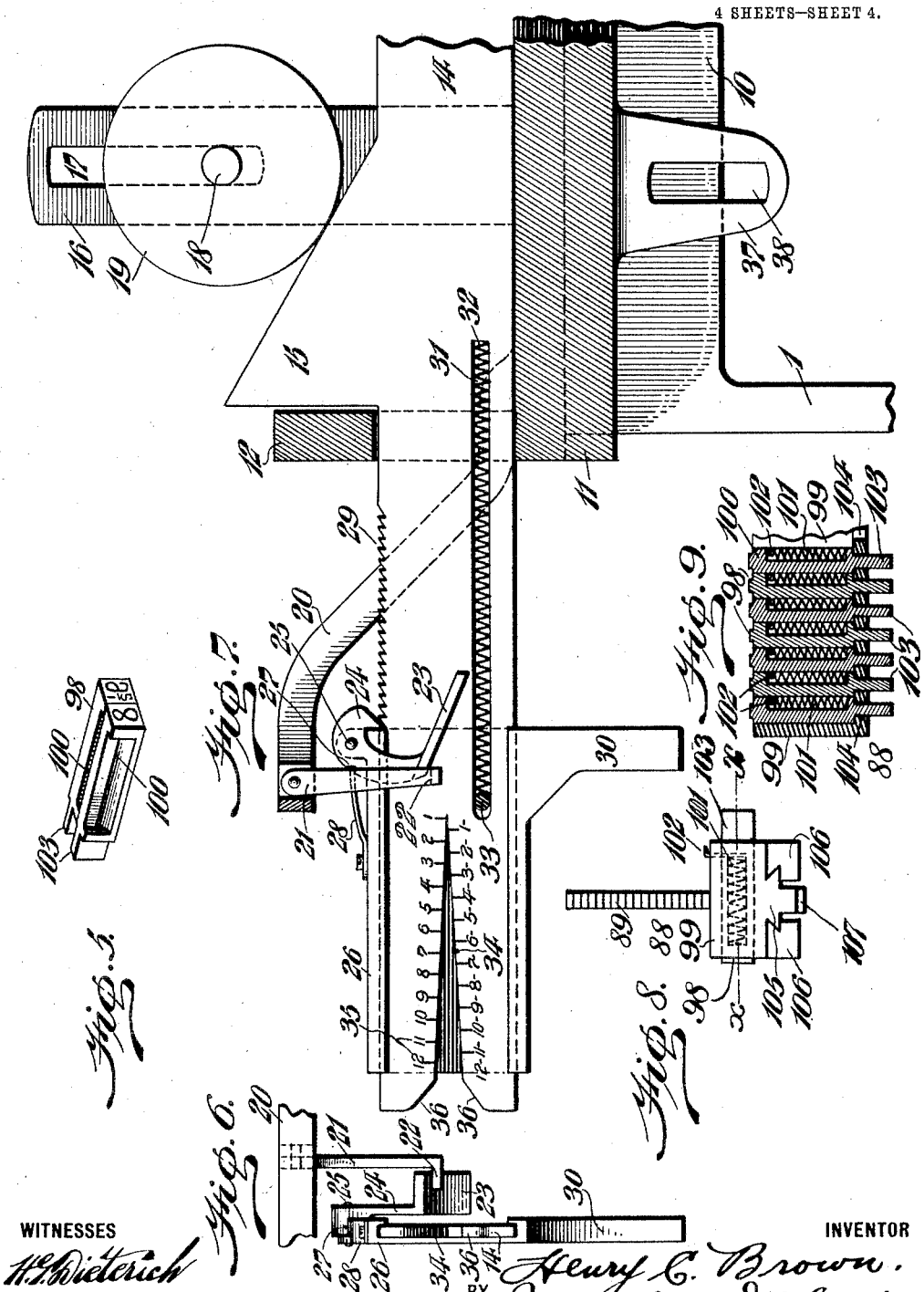
WITNESSES
INVENTOR
Henry C. Brown.
BY
ATTORNEYS

UNITED STATES PATENT OFFICE.

HENRY C. BROWN, OF BROOKLYN, NEW YORK, ASSIGNOR TO HENRY STOCKMAN, OF ENGLEWOOD, NEW JERSEY.

GRADING, STAMPING, AND SELECTING MACHINE.

1,081,361.  Specification of Letters Patent.  Patented Dec. 16, 1913.

Application filed September 25, 1912. Serial No. 722,215.

*To all whom it may concern:*

Be it known that I, HENRY C. BROWN, a citizen of the United States, residing in the borough of Brooklyn, county of Kings, State of New York, have invented a new and useful Grading, Stamping, and Selecting Machine, of which the following is a specification.

My present invention consists of a novel grading, stamping and selecting machine for cut leather soles which is adapted to either number and select, or only to number, or to select without numbering.

It further consists of a novel machine of the type specified which is adapted to employ a measuring iron similar to the kind employed in manually measuring soles and in conjunction with which a novel construction of a gage is employed, which is automatically retained at the point measured on the iron.

It further consists of a novel type case and novel means, including a novel ratchet mechanism, for actuating said type case and the type carried thereby.

It further consists of a novel distributing funnel and novel means for actuating the same.

It further consists of a novel construction of a support for the soles and novel means for removing the soles from such support, after they have been measured.

It further consists of novel means for moving a plurality of sets of measuring devices with respect to the article to be measured, and automatically locating in stamping position a type corresponding to the measurement of the article, novel means for bringing a measured article into stamping position and retaining it in such position, and novel means for distributing the soles into different receptacles in accordance with their grade or thickness.

It further consists of novel means actuated by the measuring mechanism for positioning the stamping mechanism and the distributing funnel.

It further consists of other novel features of construction, all as will be hereinafter fully set forth.

For the purpose of illustrating my invention, I have shown in the accompanying drawings preferred embodiments which are at present preferred by me, since the same have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a grading, stamping and selecting machine for cut leather soles, embodying my invention. Fig. 2 represents a side elevation of Fig. 1, certain parts having been omitted for the sake of clearness of illustration. Fig. 3 represents a side elevation showing a continuation of a portion of Fig. 2. Fig. 4 represents a plan view of my device, certain parts thereof having been omitted for the sake of clearness of illustration. Fig. 5 represents a perspective view of two of the type in detached position. Fig. 6 represents an end elevation of a portion of Fig. 7. Fig. 7 represents a side elevation partly in section of a portion of my device, showing more clearly a full sized view of one of the measuring irons and certain of its adjuncts. Fig. 8 represents an end elevation of the type case in detached position. Fig. 9 represents a section on line $x$—$x$ Fig. 8.

Similar numerals of reference indicate corresponding parts in the figures.

Referring to the drawings:—1 designates the frame of the machine, the construction of which may vary widely in practice, and in which is mounted a driving shaft 2, having mounted thereon a pulley 3, whereby said shaft may be driven by any desired source of power. The driving shaft 2 has mounted thereon a gear 4 which meshes with a gear 5 mounted on a shaft 6 journaled in the frame-work 1. The shaft 2 also has mounted thereon a gear 7 which meshes with a gear 8 mounted on a shaft 9 journaled in the frame 1.

10 designates guides on the frame-work, and in which are adapted to reciprocate the saddles 11, which latter are provided with the housings or guides 12 and 13.

14 designates the measuring irons which are slidably mounted in the guides 12 and 13 and the forward movement of an iron relatively to the saddle 11 is limited by the engagement of a cam 15 with the guide 12.

The saddles 11 are provided with standards 16 which are slotted as indicated at 17, in order to receive the pins 18 carried by the rollers 19, which latter engage the operative faces of the cams 15.

In the present instance I have shown three sets of irons and their adjuncts, one set being mounted on each side of the machine, and one set being mounted at the rear of the machine, it being understood that the number of irons employed in each set may vary in accordance with the condition and requirements met with in practice.

20 designates a bracket carried by the guides 10 and pivotally connected with said bracket 20 are a plurality of pawl releasing arms 21 each provided at its lower end with a laterally deflected arm 22 which coacts at certain times with the underface of an arm or lug 23 carried by a pawl 24, which latter is pivoted at 25 to a sliding gage 26 slidably mounted upon an iron 14. The pawl 24 is provided with a notch or recess 27 with which is adapted to interlock the free end of a spring 28 the other end of which is fixed to the gage 26. The pawl 24 is adapted to engage the ratchet 29 on an iron 14. Each gage 26 is provided with a depending arm 30. In order to return the gage 26 to its normal or initial position, each iron is slotted as is indicated at 31, thereby adapting the same to receive a spring 32, the forward end of which abuts against a pin 33 which passes through said slot and engages the gage 26 while the other end of said spring abuts against the rear wall of the slot 31. The forward end of an iron 14 is provided with a V-shaped groove 34 one or more walls of which may be provided with calibrations or indicating data 35, it being noted that the forward end of the V-shaped slot 34 is outwardly inclined or beveled as indicated at 36. The saddles 11 are provided with depending lugs 37 each having a slot 38 therein.

39 designates a pin or roller carried by a lever 40, at the right hand side of the machine and fulcrumed at 41 to the frame 1.

42 designates a slot in the lever 40 through which passes a pin or roller 43 carried by a driving disk 44 mounted on the shaft 9. The pin 43 is preferably provided with a sliding block 45 in which the pin revolves to prevent undue wear and which slides in the slot of the lever 40.

The left hand side of the machine is provided with a driving disk 46 mounted on the shaft 6 and provided with a pin 47 traveling in a slotted lever 48 which is pivotally carried by the frame 1 and has its free end in operative engagement with a saddle 49.

Since the arrangement of the saddle, the set of measuring irons and its adjuncts are constructed in a similar manner to those already described with reference to the right hand portion of the machine I have deemed it unnecessary to describe the detailed construction of the left hand set, since the same would involve needless repetition.

At the rear of the machine there is arranged a third set of irons and means for operating the same, it being understood from Fig. 2, that a slotted lever 50 is employed which is pivotally connected with the frame and actuated by a pin 51 which is carried by two disks 52 and 53, mounted on the shaft 2 which it will be understood is a sectional shaft, the end of one section carrying the driving disk 52 and the end of the other section carrying the driving disk 53.

Since the construction and arrangement of the rear set of irons and the manner of operating the same is similar to that already described with reference to the right and left hand set of irons I have deemed it unnecessary to describe in detail the construction thereof since the same would involve needless repetition.

The lever 50 actuates the saddle 11 of the rear set of measuring irons.

55 designates a bracket which in the present instance consists of a U-shaped bar mounted in the path of the depending arms 30 of the right hand set of gages and having its ends mounted on a shaft 56 journaled in the frame 1. Said shaft being connected by means of a universal coupling 57 with a shaft 58 which carries a bracket 59 adapted to coöperate with the depending arms of the gages of the rear set. The shaft 56 has secured thereto an arm 60 the outer end of which preferably forms a cam surface and coöperates with a roller 61 mounted on a pawl 62.

63 designates a bracket similar to the brackets 55 and 59 and this bracket 63 is mounted on a shaft 64 journaled in the frame 1 and connected with said shaft 64 is an arm 65 the end of which is preferably provided with a cam face coöperating with the roller 61.

66 designates a shaft journaled in the frame 1 and having mounted thereon a support 67 for the cut leather soles, and in the present instance comprises a body portion 68 having a desired number of outwardly extending arms 69 which are preferably recessed in order that a leather sole shown in dotted lines in Fig. 4, will be properly positioned and supported.

70 designates a gear segment mounted on the shaft 66 and meshing with a segmental rack 71 which is pivoted at 72 to the frame of the machine.

73 designates a link one end of which is pivoted at 74 to the segmental rack 71 while the other end thereof is pivoted to a lever 75 which is pivoted at 76 to the frame 1. The outer end of the lever 75 has mounted thereon a roller 77 which coöperates with the outer periphery of the cam disk 53 as will be best understood by reference to Fig. 4.

Mounted in front of the support 67 so that the leather soles may discharge thereinto is a hopper or discharge conduit 78, the lower end of which is adapted to be closed at certain times by a valve or gate 79 carried by an arm 80 secured to a lever 81 pivoted in the frame of the machine and provided with a roller 82 coöperating with a cam 83 on the driving disk 44.

84 designates an arm having preferably a curved face near its end which rides on the roller 61, said arm 84 being pivotally supported at 85 and connected with an arm 86 to which latter is secured one end of a link 87, the other end of which is pivoted to the type case 88 which is mounted for reciprocating movement in the frame 1, it being understood that the type case 88 is retained in the position to which it has been advanced by the engagement of the pawl 62 with the steps or teeth 89, arranged on the type case in the present instance in different horizontal planes.

The driving disk 46 is provided with a cam 90 which coöperates with a cam 91 on a lever 92 which latter is pivotally mounted and has connected therewith a link 93 which is pivoted to a link 94 secured to a pin 95 mounted in the casing 1. To this pin 95 is secured a hammer arm 96 which carries at its outer end the hammer 97 into alinement with which one of the type 98 is positioned, as will be clearly set forth in the description of the operation. The type 98 are mounted in a type casing 99 and the construction of the type will be best understood by reference to Figs. 5 and 9. Each type at its forward end is provided with the desired indicating data or characters which it is desired to impress upon the goods passing through the machine. Each type is recessed as is indicated at 100 and in this recess is contained a spring 101, one end of which abuts against the rear wall of the recess while the other end abuts against a pin 102 carried by the casing 99 and extending into a slot or recess 100, which in the present instance opens through a side of one of the type so that when the type are in position the springs are maintained in position by the different type. Each type is provided with a rearward extension 103 to which the blow of the hammer 97 is imparted, said extensions 103 passing through apertures 104 in the casing 99. The casing 99 is provided with a bottom member 105 which is adapted to slide on the guides 106 carried by the frame 1, and in the present instance the bottom member 105 is provided on its under face with a rack 107, with which is adapted to mesh a gear segment 108, which is pivoted at 109 to the frame and is provided with a slotted end 110 into the slot of which extends a pin 111 carried by a distributing funnel 112, the upper end of which latter is adapted to register with the discharge end of the chute 78 while the lower end thereof is adapted to register with one of the compartments 113, in a bin 114 which is adapted to receive the leather soles after they have passed through the machine.

115 designates a link, one end of which is pivoted to the lever 40, while the other end thereof is provided with a slot 116 into which extends a pin 117 secured to the gear segment 108.

The hubs of the levers 94 and 96 are provided with springs 118 and 119 and have their relative rotary movement limited by a lug and slot connection.

The operation of my novel grading, stamping and selecting machine will now be readily apparent and is as follows:—Assuming that the parts are in their normal or initial position as indicated in Fig. 1, the leather sole or other article to be measured is placed on the support 67 as will be understood by reference to Fig. 4. The rotation of the pulley 3, which is caused in any desired manner, will cause the shafts 2, 6 and 9 to revolve, thereby rocking the levers 40, 48 and 50 and causing the saddles 11 of the three sets of measuring irons to travel inwardly toward the cut leather sole. This causes the irons 14 to be moved inwardly against the leather as far as the apertures 34 in the irons will permit and causing the gages 26 to be moved rearwardly on the irons, each pawl 24 engaging with the teeth of the ratchet 29 so that each measuring gage will be retained at the point measured. The balance of the forward thrust of the saddles 11 is compensated for by the cam member 15 of an iron, being forced back under its respective roller 19, which tends to keep a continual light pressure on the iron without injuring the leather. The above operation constitutes the actual measuring and the automatic operation of the iron is comparatively like the use of the iron by hand. The parts are timed so that as the irons are moved rearwardly out of engagement with the sole being measured, the roller 77 will be actuated by the eccentric 53, thereby causing the link 73 to actuate the gear segment 71, which latter will coöperate with the gear segment 70 to rock the shaft 66 on which the support 67 is mounted, thereby rocking said support 67 and causing the sole which has been measured to pass into the receiving hopper or tube 78. Since the gate 79 at this time closes the lower end of the hopper 78, the sole which has entered the hopper heel first will be retained in the bottom thereof in the proper position to be numbered. The saddles 11 continuing in their return movement draw the gages 26 rearwardly and the gage 26 which has been pushed back the farthest on its respective iron, thereby indicating the thinnest part of the sole, will actuate a bracket 55, thereby rocking the lever 60 to cause the pawl 62 to be raised a corresponding distance. As the roller 61 carried by the pawl 62 is moved upwardly, it actuates the levers 84 and 86 and causes the type case 88 to be advanced a distance corresponding to a figure or character which is to indicate the measurement which has been taken, it being understood that the pawl 62 retains the type case 88 at such point. The cam 90 now coöperates with the cam face 91 on the lever 92 and causes the link 93 to actuate the arms 96 and 94 through the spring 118 and causes the hammer 97 to engage the predetermined type to cause the latter to move through an aperture (not shown) in the hopper 78 and against the leather with force enough to impress the figure or character into the leather. As the cam 90 is released from the cam face 91, the spring 119 causes the hammer 97 to snap back into its initial or inoperative position. The cam 83 now coöperates with the roller 82 to cause the lever 80 to withdraw the gate 79 from the hopper 78 so that the sole which has been measured and stamped may pass into the distributing funnel 112. By means of the gear segment 108 which meshes with the rack 107 of the type case 88, and the pin 111, which coöperates with the walls of the slot 110, the funnel 112 is moved to a position over the receptacle 113 corresponding to the number which has been stamped on the sole and the sole falls from the funnel into the said receptacle. After the leather has been measured, stamped and distributed, the return of the parts to their normal position is continued. As the saddles 11 and irons 14 continue their inward movement, the laterally extending arm 22 of the tripper 21 will engage the under face of the arm or lug 23 carried by the pawl 24 to cause said pawl to be disengaged from the ratchet 29 on its respective iron 14 until the iron is returned to its normal position, at which time the pawl 24 will engage with the last tooth of the ratchet 29, it being apparent that the spring 31 assists in the return movement just described, so that all the irons and the gages of the different sets are returned to their initial position. Since the brackets or levers 55 follow back against the depending arms 30 of the gages 26, the arms 60 will move away from the roller 61. The pawl 62 which carries the roller 61 would not fall if the ratchet 89 were not withdrawn and in order to accomplish this withdrawal of the ratchet, the link 115 is moved outwardly and the end wall of the slot 116 coming in contact with the pin 117 draws the gear 108 and the type case 88 back to its initial position and permits the pawl 62 to fall step by step, so that all of the parts are now in their initial or normal position.

The type case and the distributing funnel are both removable in order to provide for the machine being run for either numbering and selecting or numbering only or selecting without numbering.

Special attention is directed to the fact that in my novel machine, I am enabled to automatically measure, stamp and select, by the use of a measuring iron, corresponding to the type which is ordinarily manually actuated. Attention is also directed to the novel manner of actuating the different sets of measuring irons and their gages, the novel means employed for positioning the type case, the novel construction of type mechanism and indicating data and the novel construction and arrangement of the distributing funnel and the bins coöperating therewith.

It will now be apparent that I have devised a novel and useful construction of a grading, stamping and selecting machine, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a machine of the character stated, a plurality of sets of irons, each having an article measuring slot leading from an end thereof, means for moving the irons until stopped by the walls of the measuring slots thereof coming into contact with the article being measured, a gage mounted for movement along the measuring slot of each iron by contact with the article, and stamping mechanism controlled by that gage which has measured the thinnest part of the article and adapted to mark the article with a character corresponding with the thickness of the article at the thinnest part.

2. In a machine of the character stated, a plurality of sets of irons, each having an article measuring slot leading from an end thereof, means for moving the irons until stopped by the walls of the measuring slots thereof coming into contact with the article being measured, a gage mounted for movement along the measuring slot of each iron by contact with the article, stamping mechanism controlled by that gage which has measured the thinnest part of the article and adapted to mark the article with a character corresponding with the thickness of the article at the thinnest part, and means controlled by the stamping mechanism to distribute the articles in accordance with their thickness.

3. In a machine of the character stated, a plurality of sets of irons, each having an article measuring slot leading from an end thereof, means for moving the irons until stopped by the walls of the measuring slots thereof coming into contact with the article being measured, a gage for each iron and mounted for movement along the measuring slot thereof by contact with the article being measured, and selecting mechanism controlled by that gage which has measured the thinnest part of the article to separate the articles in accordance with their measurement.

4. In a machine of the character stated, a plurality of sets of irons, each having an article measuring slot leading from an end thereof, means for moving the irons until stopped by the walls of the measuring slots thereof coming into contact with the article being measured, a gage for each iron mounted for movement along the measuring slot thereof by contact with the article being measured, means to interlock each gage with its respective iron at the point measured, a series of article stamps, and means controlled by that gage which has measured the thinnest part of the article to cause that stamp having a character corresponding with the thinnest part measured to engage the article.

5. In a machine of the character stated, a plurality of sets of irons, each having an article measuring slot leading from an end thereof, means for moving the irons until stopped by the walls of the measuring slots thereof coming into contact with the article being measured, a gage for each iron mounted for movement along the measuring slot thereof by contact with the article being measured, means to interlock each gage with its respective iron at the point measured, a series of article stamps, means controlled by that gage which has measured the thinnest part of the article to cause that stamp having a character corresponding with the thinnest part measured to engage the article, a series of bins, and a distributer controlled by the positioning of the proper article stamp to discharge an article after being stamped into the bin corresponding to the thickness of the article.

6. In a machine of the character stated, a plurality of sets of irons, each having an article measuring slot leading from an end thereof, means for moving the irons until stopped by the walls of the measuring slots coming into contact with the article being measured, a gage mounted for movement along the measuring slot of each iron by contact with the article, each gage having a cam thereon, a weight resting on said cam, stamping mechanism including a series of article stamps, and means controlled by that gage which has measured the thinnest part of the article to position a stamp having a corresponding character and to cause said stamp to mark the article.

7. In a device of the character stated, a plurality of sets of irons, each having an article slot leading from an end thereof, means for moving the irons until stopped by the walls of the measuring slots coming in contact with the article being measured, a gage mounted for movement along each iron until stopped by the article coming into contact therewith, means to fix each gage at the point measured, means to move an article into stamping position and hold the same during the stamping operation, a series of article stamps, means controlled by that gage which has measured the thinnest part of the article to cause a stamp having a corresponding character to engage the article, and means to release said article after being stamped.

8. In a device of the character stated, a plurality of irons, each having an article measuring slot leading from an end thereof and provided with a ratchet, means for moving the irons until stopped by the walls of the measuring slots thereof coming into contact with the article being measured, a gage mounted for movement along the measuring slot of each iron by contact with the article, pawls carried by said gages and interlocking with said ratchets at the point measured, releasing means for said pawls, and means controlled by that gage which has measured the thinnest part of an article to separate the articles in accordance with their measurements.

9. In a device of the character stated, a plurality of irons, each having an article measuring slot leading from an end thereof and provided with a ratchet, means for moving the irons until stopped by the walls of the measuring slots thereof coming into contact with the article being measured, a gage mounted for movement along the measuring slot of each iron by contact with the article, tension devices for said gages, pawls carried by said gages and interlocking with said ratchet at the point measured, releasing means for said pawls, and means controlled by that gage which has measured the thinnest part of an article to separate the articles in accordance with their measurements.

10. In a device of the character stated, an article support, a plurality of irons, each having an article measuring slot leading from an end thereof, means for moving the irons until stopped by the walls of the measuring slots thereof coming in contact with the article being measured, a gage mounted for movement along the measuring slot of each iron by contact with the article, means to remove an article from said support, and means controlled by that gage which has measured the thinnest part of the article to grade the articles in accordance with their thickness.

11. In a device of the character stated, a support, a plurality of sets of irons, each having an article measuring slot leading from an end thereof, means for moving the irons until stopped by the walls of the measuring slots thereof coming into contact with the article being measured, a gage mounted for movement along the measuring slot of each iron by contact with the article, a discharge conduit, means to discharge an article from said support into said discharge conduit, means to retain for a desired interval an article in said discharge conduit, a series of article stamps, and means controlled by that article which has measured the thinnest part of an article to cause a stamp having a corresponding character to mark an article retained in said discharge conduit.

12. In a device of the character stated, a support, a plurality of sets of irons, each having an article measuring slot leading from an end thereof, means for moving the irons until stopped by the walls of the measuring slots thereof coming into contact with the article being measured, a gage mounted for movement along the measuring slot of each iron by contact with the article, a discharge conduit, means to discharge an article from said support into said discharge conduit, means to retain for a desired interval an article in said discharge conduit, a series of article stamps, means controlled by that gage which has measured the thinnest part of an article to cause a stamp having a corresponding character to mark an article retained in said discharge conduit, and means to release said retaining means.

13. In a device of the character stated, a support, a plurality of sets of irons, each having an article measuring slot leading from an end thereof, means for moving the irons until stopped by the walls of the measuring slots thereof coming into contact with the article being measured, a gage mounted for movement along the measuring slot of each iron by contact with the article, a discharge conduit, means to discharge an article from said support into said discharge conduit, means to retain for a desired interval an article in said discharge conduit, a series of article stamps, means controlled by that gage which has measured the thinnest part of an article to cause a stamp having a corresponding character to mark an article retained in said discharge conduit, and means controlled by the positioning of the stamp which has indicated the thinnest part measured of the article to distribute the article from said conduit in accordance with its measurement.

14. In a device of the character stated, a support, a discharge conduit in proximity thereto, a plurality of irons, each having an article measuring slot leading from an end thereof, means for moving the irons until stopped by the walls of the measuring slots thereof coming into contact with the article being measured, a gage for each iron and positioned in accordance with the travel of an iron with respect to the article, means to actuate said support to cause an article to be discharged therefrom into said discharge conduit, a series of article stamps, means controlled by the gage which indicates the thinnest part of the article measured to position a stamp having a corresponding character with respect to the article in said conduit, and means to actuate said positioned stamp.

15. In a machine of the character stated, a plurality of irons, each having an article measuring slot leading from an end thereof, means for moving the irons until stopped by the walls of the measuring slots thereof coming into contact with the article being measured, a gage for each iron and positioned by contact with the article, stamping mechanism including a series of article stamps and a hammer, means controlled by that gage which has measured the thinnest part of an article to move said stamping mechanism to bring a stamp having a corresponding character into operative position with respect to said article and said hammer, means to actuate said hammer, and means to permit a stamped article to pass from the machine.

16. In a machine of the character stated, an article support, a plurality of sets of irons, each having an article measuring slot leading from an end thereof and located at different sides of said support, means for moving said irons toward said support until stopped by the walls of said measuring slots coming into contact with the article, a gage mounted for movement along the measuring slot of each iron by contact with the article, means to discharge a measured article from said support and retain the same in stamping position, a type-case having a plurality of type therein and positioned with respect to the article by that gage which has indicated the thinnest part of the article, said type-case having a rack thereon, means to actuate the type positioned by the movement of said type-case, a distributing funnel movably mounted and having a rack coacting with the rack on said type-case, and a plurality of separate bins having an open end over which the discharge end of said funnel travels.

17. In a device of the character stated, an article support, three sets of irons, each having a V-shaped article measuring slot therein, there being a set located at each side of and at one end of said support, means to move said irons until stopped by the article engaging with the walls of said slots, a gage mounted for movement along each iron in accordance with the thickness measured, and means controlled by that gage, to which has been imparted the greatest travel, to grade the article in accordance with its thickness.

18. In a device of the character stated, an article support, three sets of irons each having a V-shaped article measuring slot therein, there being a set located at each side of and at one end of said support, means to simultaneously move said irons until stopped by the article engaging with the walls of said slots, a gage mounted for movement along each iron in accordance with the thickness measured, and means controlled by that gage, to which has been imparted the greatest travel, to grade the article in accordance with its thickness.

19. In a device of the character stated, an article support, a plurality of saddles mounted to reciprocate with respect to said support, irons independently movable on said saddles and each provided with a V-shaped slot, means to actuate said saddles to cause the walls of said slots to engage the articles and arrest the travel of said irons, a gage for each iron and mounted for movement along each iron by contact with the article, and means controlled by that gage which indicates the thinnest part of the article to grade the article in accordance with the thinnest part measured.

20. In a device of the character stated, an article support, a plurality of saddles mounted to reciprocate with respect to said support, irons independently movable on said saddles and each provided with a V-shaped slot, means to actuate said saddles to cause the walls of said slots to engage the article and arrest the travel of said irons, a gage for each iron and mounted for movement along each iron by contact with the article, and means controlled by that gage which indicates the thinnest part of the article to mark the article with a character corresponding to the thinnest part measured.

HENRY C. BROWN.

Witnesses:
BRUNO BLEUL,
HENRY L. STOCKMAN.